United States Patent [19]

Detroit

[11] 4,219,471

[45] Aug. 26, 1980

[54] LIGNOSULFONATE DERIVATIVES

[75] Inventor: William J. Detroit, Schofield, Wis.

[73] Assignee: American Can Company, Greenwich, Conn.

[21] Appl. No.: 876,327

[22] Filed: Feb. 9, 1978

[51] Int. Cl.$^2$ ............................ C07G 1/00; C04B 7/02; C04B 13/00; E21B 33/13

[52] U.S. Cl. ................................. 260/124 R; 106/90; 106/315; 166/293

[58] Field of Search .................... 260/124; 106/90, 315

[56] References Cited

U.S. PATENT DOCUMENTS

| | | | |
|---|---|---|---|
| 3,578,651 | 5/1971 | Ludwig | 260/124 |
| 3,841,887 | 10/1974 | Falkehag et al. | 260/124 R |
| 4,047,567 | 9/1977 | Childs | 260/124 R |

*Primary Examiner*—Delbert R. Phillips
*Attorney, Agent, or Firm*—Robert P. Auber; George P. Ziehmer; Douglas W. Wyatt

[57] ABSTRACT

This invention relates to lignosulfonate derivatives and alkali metal salts thereof derived from sulfite waste liquor that has been subjected to alkaline oxidation, hydrolysis and partial desulfonation with subsequent resulfonation; and followed by one or more addition and double decomposition and reactions thereof; as well as the method of cementing subterranean geological formations penetrated by well bores utilizing these additives in well cementing compositions.

13 Claims, No Drawings

LIGNOSULFONATE DERIVATIVES

BACKGROUND OF THE INVENTION

This invention relates to the preparation of novel additives for use in hydraulic cement compositions and particularly oil well cementing compositions and processes, and to methods for producing these novel additives.

The subterranean geological formations penetrated by well bores for production of petroleum and gas have been at increasingly greater depths, encountering in the process, an increasingly rigorous environment including significantly higher temperatures. In addition, an increasing number of wells requiring cementing are also disposed in offshore salt water environments so that the cementing compositions must manifest a compatibility with, or tolerance to, salt.

The cementing compositions are used particularly for sealing or cementing the annular space in a well bore between the casing of the well and the formation surrounding the casing. In practice the cementing composition is incorporated in a slurry, using, desirably, and by way of illustration, where an offshore well is being cemented, sea water to form the slurry. The slurry is pumped down through the well casing, into the formation and up the outside of the casing to effect the requisite seal.

As more rigorous conditions are encountered the need increases for improved additives to prevent the premature setting of the cement slurry with substantial or complete elimination of unpredictability of the cement composition and its retarding additives, including particularly, pseudosetting or gelation, in which state the cement attains a viscosity rendering it difficult or impossible to pump.

Accordingly, the invention is described in context with well cementing where the compounds of the invention have particular utility as cement retarding agents capable of significantly reducing or eliminating these difficulties, although other applications of the invention will be readily evident to those skilled in the art to which this invention pertains.

Considerations relevant to well cementing and the practices utilized in this field heretofore are described in the Report Prepared By The API MID-CONTINENT DISTRICT STUDY COMMITTEE OR CEMENTING PRACTICES AND TESTING OF OIL-WELL CEMENTS issued by AMERICAN PETROLEUM INSTITUTE ("API"), Division of Production, in Dallas, Texas 75201 as API Bulletin D-4, Corrected Edition of March 1963, entitled "*The Effects Of Drilling-Mud Additives On Oil-Well Cements*"; "*API Specification For Oil-Well Cements And Cement Additives*" (API Std 10A, Fourteenth Edition, dated April, 1969) and the "*API Recommended Practice For Testing Oil-Well Cements And Cement Additives*" (API RP 10B, Sixteenth Edition, dated April, 1969).

Numerous lignin compositions have been proposed heretofore for use as retardants in well cementing compositions and operations and are described, for example, in U.S. Pat. Nos. 2,880,102; 2,491,832; and 4,065,313. These include alkaline oxidized, hydrolyzed and partially desulfonated lignosulfonates that have been subsequently resulfonated which have been found to constitute effective, heat stable, and predictable retardants which reduce or eliminate the undesired gelation of many of the cement compositions in many of the more extreme environments in which they are incorporated.

Other patents of interest in this area include: U.S. Pat. Nos. 3,468,377; 3,478,823; 3,384,171; 3,700,031; 3,476,188; 3,532,166; U.S. Pat. Nos. 3,520,366; 3,553,130 and 3,688,844.

However, as ever more rigorous environments are explored for petroleum and natural gas, further improvements in communicating predictability, thermal stability, and resistance to pseudosetting of well cement slurries becomes necessary; and if material improvements in these characteristics could be achieved with maintenance of the other characteristics including salt tolerance and compatibility with a wide range of other components and cements, a significant advance in the state of the art will have been achieved.

SUMMARY OF THE INVENTION

It is an object of this invention, therefore, to provide novel addition and condensation products of alkaline oxidized, hydrolyzed, partially desulfonated and subsequently resulfonated lignosulfonates.

It is a further object of this invention to provide a process for securing these novel lignosulfonates.

It is a still further object of this invention to provide novel and useful additives for use in hydraulic cements having particular application as retarding agents for use in well cement compositions and slurries.

These and other objects and advantages of the invention will become evident from the following description.

Accordingly, it has now been discovered that novel lignosulfonate addition, and double decomposition products and alkali metal salts thereof derived from sulfite waste liquor that has been subjected to alkaline oxidation, hydrolysis and partial desulfonation with subsequent resulfonation and reaction thereafter, are secured having improved heat stability while effecting superior gel control and predictability as well as cement set retardation of well cements in which they are incorporated. These compositions are pepared by reaction of the foregoing lignosulfonates following resulfonation with (a) a halocarboxylic acid; (b) a halocarboxylic acid and a hydroxy-substituted lactone; (c) a hydroxy-substituted lactone as aforesaid; (d) a halocarboxylic acid; and sequentially, the derivative of sugar acid-containing spent sulfite liquor derived from contacting a spent sulfite liquor with a cyanide followed by hydrolysis; or (e) the foregoing derivative of said spent sulfite liquor. The invention is directed as well to the process of cementing subterranean geological formations penetrated by well bores utilizing those novel well cementing compositions.

DETAILED DESCRIPTION OF THE INVENTION

The lignosulfonates of the invention are derived from alkaline oxidized, hydrolyzed, desulfonated and subsequently resulfonated lignosulfonates, wherein the resulfonated lignosulfonates have substituted therein, as the resulfonation units, moieties of the formula; $-(C_xH_{2x})SO_3H$, wherein x has a numerical value from 0 to 3, thus including sulfoalkyl groups of the formula $-(C_yH_{2y})SO_3H$, wherein y has a value of 1 to 3 as well as sulfonyl radicals ($-SO_3H$); and the alkali metal salt derivatives thereof; the resulfonated lignosulfonate thus formed containing between about 1½ weight percent and about 15 weight percent of total sulfur in combined organic sulfonic sulfonate form; said lignosulfonate prior to resulfonation having a relative molecular size, substantially, of from 1,000 to 20,000.

The addition and condensation products of the invention are secured by reaction of the foregoing lignosulfonate starting material with:

(a) a halocarboxylic acid, and more particularly, a carboxylic acid of the formula, $Mp(C_nH_{2n})COOH$, wherein M is a bromine or, preferably, a chlorine atom; p has a value of 1 to 3, and preferably 1; and n has a value of 1 to 7 inclusive, for example, 5-chloro caproic acid, 3-bromobutyric acid, 2-chloro propionic acid, 4-bromacaprylic acid, trichloroacetic acid or preferably monochoroacetic acid; or indeed, the corresponding iodo- and fluro;

(b) a halocarboxylic acid as aforesaid and sequentially a hydroxy-substituted γ or α-lactone containing from 4 to 6 carbon atoms and preferably a polyhydroxy-substituted lactone of the molecular formulae 1, $C_4H_6O_4$; $O_5H_8O_5$ or $C_6H_{10}O_6$ or mixtures thereof;

(c) a lactone as aforesaid;

(d) a halocarboxylic acid as characterized hereinabove; and sequentially, the derivative of a sugar acid-containing spent sulfite liquor derived from subjecting spent sulfite liquor to reaction with an alkali metal, and preferably sodium, cyanide to form the cyanohydrin of the available reducing sugars present therein, followed by hydrolysis thereof; or (e) the foregoing derivative of said spent sulfite liquor.

The reaction of the resulfonated, oxidized lignosulfonates, as characterized further hereinafter previously desulfonated, with a halocarboxylic acid is carried out in an aqueous alkaline medium having a pH preferably of at least 8. The alkaline medium is provided by an ammonium, alkali metal or alkaline earth metal, base or mixtures thereof, including, for example, carbonates, bicarbonates, or where appropriate in view of the cation employed, amines. Preferred are the hydroxides of the cations, sodium, lithium, potassium and calcium, as well as, but less desirably, strontium and barium. The reaction takes place at a temperature desirably of 20° Centigrade (C.°) to 110° C. and at ambient presure for a period of 2 to 6 hours; and most desirably at a temperature of about 80° C. to 100° C. for about 5 hours. The parameters of time, temperature and pressure are not, however, narrowly critical.

In a significantly preferred embodiment however, the foregoing carboxyalkylated product (and most desirably the carboxymethylated derivative) secured is further reacted with one or more of the foregoing hydroxy substituted lactones, and preferably glucono-delta-lactone, in an amount by weight of 5 percent to 20 percent, and preferably about 7.5 percent of said lactone to total lignosulfonate halocarboxylic reaction product to provide a further product, believed to be an addition reaction product of the lactone and the acid condensation reaction product of the previous step; a product, characterized surprisingly by an ability to impart an even more significantly enhanced stability to temperature and pressure, predictability, salt tolerance and resistance to gelation to hydraulic cements combined with extension in the period in which setting of the cement occurs even at the extremely elevated temperatures found in well bores at depths of 10,000 feet or 16,000 feet, or more. The lactone is conveniently introduced into the reaction product mixture of lignosulfonate and halocarboxylic acid.

The hydroxylated lactones are similarly reacted with the lignosulfonate starting materials without the intermediate reaction with halocarboxylic acid in a further embodiment in which, however, the resulting product, while superior to the lignosulfonate starting material as a cement retarding agent is nevertheless less efficacious in securing predictable cement retardation with high salt tolerance than the chloro- or bromocarboxylic acid-lignosulfonate condensation product and significantly less than the acid condensation-lactone reaction product.

Whether added to the resulfonated lignosulfonate unreacted with halocarboxylic acid or introudced into the acid condensation reaction product mixture, the reaction goes to completion over a relatively abbreviated period of 0.5 hour to 1.5 hour and preferably about 0.5 hour, and is undertaken desirably at ambient pressure in a temperature range of from 75° C. to 100° C., and preferably 80° C. to 85° C.

While not intending to be limited by any theoretical considerations of the reaction process involved, it is believed that the lactones react with the active hydrogen sites of the lignosulfonate reactant, and particularly the oxygen of the phenolic group to form either linkages and, contemporaneously therewith, the sulfonic groups, with which the lactones are believed to form esters.

As indicated hereinabove, novel and improved cement retardants are also secured, as well, by reaction of the lignosulfonate starting materials or their halocarboxylic acid condensation reaction products with a spent sulfite liquor product formed by cyanohydrin reaction and hydrolysis of available reducing sugars; and more particularly by reaction of a cyanide in stiochiometric proportions calculated on the basis of glucose content for all of the reducing sugars present as in application of the classic Kiliani-Fischer cyanohydrin synthesis. Where the foregoing cyanohydrin reaction is contemplated, the reactant spent sulfite liquor is first modified by addition of reducing sugars in an amount sufficient to attain a concentration of reducing sugars therein of about 25 percent by weight. Of this sugar content, 18 percent to 20 percent constitutes, preferably, pentoses and about 20 percent to 25 percent, hexoses. The reaction sequence further reflecting the application of the Killiani cyanohydrin synthesis, is completed by hydrolysis of the resulfonated resulfint cyanohydrin to the corresponding sugar acid. The result of this reaction is to introduce an additional carbon into each sugar molecule. Hence, there results a lignosulfonate, wherein the reducing sugar content totalling up to about 25 percent of the solids content thereof, is converted substantially to sugar acids totalling in excess of 25 percent and up to about 32 percent by weight of the lignosulfonate solids content with the pentose and hexose content thereof being converted to corresponding concentrations by weight of the total sugar acid content, that is to about 18 percent to 20 percent of 6 membered sugar acids and 20 percent to 25 percent of 7-membered sugar acids. Hydrolysis is effected conveniently by introducing the cyanohydrin into an aqueous alkaline solution having a pH of about 10 for a period of about 1 hour at a temperature of 70° C. to 80° C. at atmospheric pressure in accordance with the foregoing Killiani synthesis.

The latter content has been found to be particularly effective in providing desirably high temperature and high pressure resistant cement retarding additives. Indeed, a lignosulfonate product of the invention derived from reaction with a spent sulfite liquor resulting in turn from the cyanohydrin reaction sequence wherein this sulfite liquor product designated hereinafter for conveneince as KELIG 32, contains concentrations of 7-membered sugar acid well in excess of 20 percent, that is from 20 percent to 75 percent or more of the total sugar acid content present, provide highly desirable cement retardants. These latter lignosulfonates are of particular utility when they have been subjected to reaction with the reaction product of resulfonated, desulfonated lignosulfonates and a halocarboxylic acid, particularly chloroacetic acid, which imparts a unique thermal cement retarder capability to these cements.

Whether introduced into the resulfonated lignosulfonate unreacted with halocarboxylic acid or added to the acid condensation product mixture, the reaction goes to completion over a relatively abbreviated period of 0.5 hour to 1.5 hour and preferably about 0.5 hour, as in the case of lactone addition, and is undertaken at ambient pressure most conveniently at a temperature in the range of about 50° C. to about 100° C. and preferably from 60° C. to 90° C. Hydrolysis of the resulting cyanohydrin is readily effected by standard means.

The spent sulfite liquor employed in forming the reactant derivative for use herein is that secured from the standard hard acid sulfite pulping process using hardwood, preferably, or softwood pulp. The spent sulfite liquor is preferably concentrated from a dilute content of about 14 percent solids as received from the digester to a concentration preferably of about 45 percent solids. This concentration is secured by evaporation in a conventional spent sulfite liquor evaporator, e.g. a standard Triple Effect Rosenblad evaporator.

As indicated hereinabove, the lignosulfonates employed as reactant starting materials in the practice of the invention are the derivatives of an oxidized, partially desulfonated lignosulfonate obtained in the spent oxidized liquor from a dilute vanillin oxidized softwood, or although less desirably, hardwood, spent sulfite liquor by acidification prior to vanillin extraction with an organic solvent as described in U.S. Pat. No. 2,491,832; and, having assumed a relatively uniform molecular size are further treated with, for example, sodium bisulfite and an aldehyde, preferably formaldehyde, at elevated temperature, e.g. 160° C. and pressure (150 psi) to sulfoalkylate, and desirably, sulfomethylate, the desulfonated lignosulfonate molecules as described in U.S. Pat. No. 4,069,217.

Using the process of U.S. Pat. No. 2,491,832, the degree of desulfonation realized is a factor of, and controlled by, the amount of caustic interjected in the reaction; the strength of the oxidation effected (i.e., the relative amount of air or oxygen employed, being careful to avoid such severe oxidation conditions as might induce demethylation); the reaction time and temperature schedules followed, and the solids dilution, generally, aqueous, of the lignosulfonate-containing spent sulfite liquor effluent being treated (with greater dilution conditions tending to lead to more extensive desulfonation probably as a result of the increased availability of the reacting molecules of the oxidizing influence applied).

While very desirable partially desulfonated lignosulfonate materials are prepared with the alkaline oxidation conducted on a spent sulfite liquor containing, on a weight percent basis, from about 30 to 35% of dissolved solids, the spent liquors being cooked in the desulfonation process may have as little as 14–10% to as much as 40% solids content in order to obtain beneficial desulfonated products.

Practically, almost any caustic alkaline solution can be employed for effecting the partial desulfonation reaction, although lower alkalinity generally results in less desulfonation. More base or caustic (NaOH) is required when sugars and other saccharides are present (and they are usually present with otherwise untreated spent sulfite liquors) in more substantial amounts, in order to effect the decomposition of the saccharides. Ordinarily, very good results are achieved when sufficient caustic concentration is maintained throughout the desulfonating cook to maintain the reaction mass in the relatively high pH range of between about 10.5 and about 11. For example, satisfactory proportion of lignosulfonate solids to caustic employed in the reaction mass involves use of an aqueous lignosulfonate solution of about 31–32 weight percent (wt.%) having a specific gravity from about 1.22 to about 1.24 and containing a caustic concentration in the solution of about 140 gms. NaOH/liter.

Adequate oxidation conditions to achieve desired ranges of desulfonation of the lignosulfonate in the spent sulfite liquor may be achieved by providing, almost invariably from either air or oxygen passed thorugh the cooking reaction mass, between about 20–25 or so and about 40–50 or so grams of elemental oxygen (i.e., $O_2$) for each 100 grams of lignin in the lignosulfonate material being desulfonated. In actual practice to obtain a frequently more desirable range of partially desulfonated material, between about 27 and 35 grams of $O_2$ per gram of lignin are utilized.

While variations may be encountered, temperatures in the range of from about 140° C. to about 170° C., and advantageously about 165° C., are usually most desirably utilized. Of course, the reaction mass is cooked until the desired degree of desulfonation (or, when vanillin by-product is important, the desired yield of it) is obtained. Usually and at the 165° C. level the cooking time is on the order of 45 minutes or so; the optimum time to employ, as will be appreciated by those skilled in the art, depending on reaction conditions and the particular degree of desulfonation desired in the resulting partially desulsulfonated lignosulfonate material. It is oftentimes most advantageous (if not literally necessary for material handling purposes) to terminate the cooking while some free caustic still remains in the reaction mass. This tends to prevent problems of emulsification during subsequent recovery of the partially desulfonated lignosulfonate. Beneficially, and for the indicated purpose, the reaction may accordingly be finished when, say, about 4–5 gms./liter of free NaOH is found to remain in the reaction mass.

Practice of the process of U.S. Pat. No. 2,491,832 thus yields a spent oxidized liquor containing partially desulfonated, generally acid-insoluble, chemically altered organic lignin substances. These are usually isolated, or alternatively, fractionated, by acid precipitation using most desirably sulfuric acid, which eliminates various sludge-producing, mostly calcium-based, ingredients therein. After the precipation, the purified partially desulfonated lignosulfonate material is generally dissolved in caustic to yield a sodium salt.

The partially desulfonated lignosulfonate material thus obtained is obviously not directly procurable from original spent sulfite liquors as are the so-called "lignosulfonates" (the "water-soluble" calcium or equivalent lignosulfonate salt or lignosulfonic acid described, for example, in U.S. Pat. No. 2,880,102). On the contrary, the partially desulfonated lignosuflonates when isolated by conventional means, such as acid precipitation or ultrafiltration, are exceptionally pure materials containing essentially no sugars or polysaccharides and having only vanishing traces, if any, of combined sulfur in sulfite form. Further, these lignosulfonates have a relatively uniform and substantially constant relative molecular size characteristics, as well as other unique and distinguishing properties.

Although a sugar and saccharide-containing spent sulfite liquor is also useful as the starting material for preparation of partially desulfonated lignosulfonates from which the resulfonated compositions used as cement retardants in the present invention are derived, otherwise treated spent sulfite liquors may equivalently be utilized. These, for example, may be those which have previously been treated in divergent ways and for other initial conversion purposes wherein the sugars and/or saccharides are utilized and consumed, as in the preliminary manufacture from raw spent sulfite liquor of yeast or alcohol or in other ways giving a sugar and/or saccharide-reducing or saccharide-free spent sulfite liquor.

The alkaline oxidized, partially desulfonated lignosulfonates which are anionic polyelectrolytes with molecular size usually on the order of 1,000 to 20,000 and from which the resulfonated products employed as cement regardants pursuant to instant practice are obtained generally have an organic sulfonic sulfur, i.e., —$SO_3$, content, calculated as percent sulfur by weight of broadly between about ½ and about 5 wt. %. More advantageously for many purposes, this sulfur range is between about 1¾ and about 3¼ wt. %; while quite often it is preferable for the partially desulfonated lignosuflonate to contain from about 2.2 to about 2.8 wt. % of the combined sulfur in the sulfonic form.

A commercially available proudct, "MARASPERSE CB" (TM), obtainable from AMERICAN CAN COMPANY, is an example of an alkaline oxidized, hydrolyzed, partially desulfonated lignosulfonate material useful as the starting material from which to derive the solubilized, re-sulfonated lignosulfonates cement retarding additives of the present invention.

"MARASPERSE CB", as usually available, generally has the following typical analysis parameters and physical characteristics features:

| TYPICAL ANALYSES (Moisture-Free and Wt. % Basis): | |
| --- | --- |
| pH - 3% Solution | 8.5–9.2 |
| Total Sulfur as S, % | 2.5–2.9 |
| Sulfate Sulfur as S, % | 0.1–0.25 |
| Sulfite Sulfur as S, % | 0–0.05 |
| CaO, % | 0.02–0.05 |
| MgO, % | Trace–0.03 |
| Na$_2$O, % | 9.4–9.9 |
| Reducing sugars, % | 0 |
| OCH$_3$, % | 12.4–12.9 |
| Sodium Lignosulfonate, % | 99–99.6 |
| Solids, % | 92–94 |

| ULTRAVIOLET ANALYSES (K-value representing base line): | |
| --- | --- |
| Upper UV: | |
| K Solids at Max. (275 mu) | 29–30.5 |
| K OCH$_3$ at Max. | 225–250 |
| Differential UV: | |
| Max. nm | 250–252 |
| K Solids at Max. | 10–11.3 |
| K OCH$_3$ at Max. | 82–88 |
| Baseline K Solids | 9.5–10.5 |
| Phenolic OH, % | 1.8–2.1 |
| OH/OCH$_3$ | 0.26–0.30 |

| PHYSICAL CHARACTERISTICS: | |
| --- | --- |
| Usual Form | Powder |
| Moisture Content (Max., % H$_2$O) | 8.0 |
| Color | Black |
| Bulk Density (lbs./cu. ft.) | 43–47 |
| Solubility in Water (%) | 100 |
| Solubility in Oils and Most Organic Solvents (%) | 0 |
| Surface Tension, 1% Sol'n (in dynes/cm) | ca. 51.4 |

While the known alkaline oxidized, hydrolyzed, partially desulfonated lignosulfonates, including such things as "MARASPERSE CB", have been considered to be desirable surfactant, dispersant and detergent compositions useful as cement retarding additives under many circumstances, they like their resulfonated successor products, have been found to have certain intrinsic limitations in crucial well cementing applications and for expanded use in this field. Noteworthy, among these difficulties with particular reference to the partially desulfonated lignosulfonates, are their relatively limited solubility in saline solutions and their unsatisfactory reliability and predictability as to gel control and cement set retardation time when used in well cement slurries and pastes in which they are incorporated.

The resulfonated lignosulfonates derived from the foregoing partially desulfonated lignosulfonates are, as indicated elsewhere herein, readily obtained by the direct sulfonation or sulfoalkylation of the referenced alkaline oxidized, hydrolyzed, partially desulfonated lignosulfonate starting material. Ordinarily, and most conveniently, this is done with appropriate sulfonating reagents in an aqueous solution of the starting material, advantageously using agitation during the reaction (which is better when applied vigorously and may be either by mechanical mixing or stirring and alternatively, or in addition, from the agitating effects of steam being pressed into the reaction mass when steam is used for heating), at any desired suitable temperature. In general, the reaction can be conducted over a temperature range from about 50° C. to about 200° C., although it is ordinarily desirable to run at least at the boil (e.g. at least 100° C. up to about 175° C. in order to avoid unduly long reaction times. Ordinarily, a temperature on the order of 160° C. is satisfactory for most resulfonation steps. Of course, the reaction is accomplished under corresponding pressure, that is from about 125 psi to 200 psi and preferably about 150 psi. when temperatures over boiling are utilized. The time of reaction generally varies with the temperature involved; lower temperatures requiring longer times. At higher temperatures the resulfonation can be completed in as little as ½ hour or so while temperatures at the lower end of the scale may require as much as 16 or more hours for completion. When conducted at about 160° C., the resulfonation cooking is usually completed within about an hour.

Any suitable sulfonation reagents may be used for the resulfonation reaction. When straight sulfonation, as opposed to sulfoalkylation, are desired, they may be advantageously accomplished with an alkali metal (such as sodium) bisulfite or sulfur dioxide. Sulfoalkylation often preferred, is accomplished with mixtures of an appropriate lower alkyl aldehyde and a bisulfite. The sulfonate group, per se, that is attached in straight sulfonation is, of course, $-SO_3H$. The sulfoalkylates, which ordinarily involve 1 to 3 carbon atom alkyl units, are of the structure $-(C_xH_{2x})-SO_3H$, wherein x is usually an integer from 0 to 3 and when x is more than 1 the alkyl unit may be linear in attachment or, as is probably the more frequent case, include a short side-chain. Combined reference to sulfonation (i.e. incorporation of $SO_3H$ groups) and sulfoalkylation are embraced by the formula; $(C_yH_{2y})-SO_3H$, wherein y has a value of from 1 to 3 inclusive.

The aldehyde utilized in at least approximate stoichiometric proportions with the bisulfite in the sulfoalkylations performed for the resulfonation is generally of the structure: RCH:O, wherein R is hydrogen or an alkyl group of from 1 to 2 carbon atoms. Obviously, if desired, mixed aldehyde reaction systems may be utilized even though there is ordinarily no particular advantage in this. Usually, it is very desirable to accomplish the resulfonation with a sulfomethylating reaction using formaldehyde ($CH_2O$) and sodium bisulfite ($NaHSO_3$) as reagents so as to effect sulfomethyl ($-CH_2SO_3H$) attachments in the resulfonated product.

As indicated, about stoichiometric relative proportions of the aldehyde and bisulfite reagents are employed for the resulfonation; these being used in amounts calculated to effect the desired extent or quantity of sulfonic acid units in the finally obtained resulfonated product. Actually a plus or minus 20% tolerance from exactly stiochiometric ratios is tolerable. In sulfomethylating reactions, the amount of formaldehyde used may vary from about 1½ to about 12 wt. % of the desulfonated starting material being resulfonated, while the bisulfite can be used, correspondingly, in quantities of between about 5 and about 40 wt. %. A particularly desirable resulfomethylated product containing about 5½ wt. % of sulfur in organic sulfonic sulfonate form is obtained by the reaction in the described manner of "MARASPERSE CB" or its equivalent, known by the trade name OPCOLOG A lignosulfonate manufactured by the Ontario Paper Company, Thoreau, Ontario Canada. with about 15 wt. % of sodium bisulfite and 4½ weight % of formaldehyde, based on "MARASPERSE CB" weight, cooked for one hour at 160° C.

The resulfonated products used as starting materials in the practice of the present invention may, if desired, contain anywhere from about 1½ wt. % to 14–15 wt. % of total sulfur in combined organic sulfonic sulfonate form. Advantageously, the range of such sulfur is between about 2¾ and about 10 wt. %, with greater desirability oftentimes attained in the sulfur wt. % range of from about 4½ to about 6½ wt. %.

While it is not intended to be bound by any particular theory, it is believed that the starting alkaline oxidized, hydrolyzed partially desulfonated lignosulfonate material (as obtained when following the procedures of U.S. Pat. No. 2,491,832) has the sulfonic acid group attachments at least substantially if not predominantly or entirely on the side chains of and in the lignin molecules, this ordinarily being on the side chain carbons which are in the alpha position relative to the ring and carrying over from the initial substitutions made during the original sulfite pulping operations. On the other hand, it is believed the sulfonate and sulfoalkyl units prepared in practice of the present invention are substantially if not predominantly or entirely positioned in the ortho and para substitutions on the aromatic rings of the lignin molecules. Thus, the resulfonated product used in practice of the instant invention as a well cement additive is, quite obviously, a basically different and dissimilar lignosulfonate from and as compared to the lignosulfonate material found in spent sulfite liquors from which are obtained the starting lignosulfonates that are resulfonated in present practice.

A typical resulfonation reaction for manufacture of the starting materials employed herein, incorporated herein by reference, is that described in U.S. Pat. No. 4,065,313 of the inventor herein and another.

The starting materials of the invention have, as indicated, a relatively narrow or uniform molecular size, as contrasted with other lignosulfonates so that these starting materials have a range in size in any specific instance of from about 10 percent to 20 percent (as measured by the diffusion method for determining relative molecular size described hereinabove. Typical resulfonated desulfonated lignosulfonates coming within the practice of the invention, as determined by this standard diffusion method, come within the range of 2500 to 4500; illustratively, 2900, 3500 and 4200; a relative molecular size sustained by these lignosulfonates during the entire period provided for complete filter passage by diffusion.

As earlier recited, the broader range in relative molecular size of the lignosulfonate starting materials is from about 1,000 to 20,000; a range which contrasts with that of conventional lignosulfonates which when measured by the foregoing diffusion method evidence a relative molecular size that extends during the diffusion period from about 1,000 to 100,000.

The resulfonated, alkaline oxidized, hydrolyzed partially desulfonated acid condensation and/or lactone or cyanohydrin reacted lignosulfonate well cement (or cementing paste) additives of the present invention are generally employed in amount, based on total resulting composition weight, between about 0.05 and about 3 wt.%. More often, the additive concentration employed is from about 0.2 to about 1.5 wt.% while frequently the most desirable range is from, say, 0.3 to 1 wt.%.

The particular quantity of additive employed generally depends in very large measure on the cement setting schedule (according to API criteria) being followed and the temperature encountered during actual setting of the cement composition. Usually, relatively more of the retarder additive is required when higher setting temperature conditions are encountered.

The lignosulfonate additives of the present invention thus are characterized by their capacity of impart to the cement compositions in which they are incorporated an excellent tolerance and resistance against premature settings and gellations under exposure to severely strong saline environments such as are frequently found in many wells due to the presence therein by infiltration or seepage of natural salt (including sea) waters. They also tend to ensure an uncommon and unusually accurate predictability as to cement setting time and character in the compositions under any given setting temperature, pressure and schedule and, significantly an unexpectedly enhanced thermal stability.

The product additives have, as noted, a narrow or similarly dimensional reatlive molecular size corresponding to that of the resulfonated desulfonated starting materials described hereinabove.

EXAMPLE 1

A commercially available product MARASPERSE CBO sometimes referred to as OPCOLIG A, obtainable from American Can Company, proivdes alkaline oxidized, hydrolysed, partially desulfonated lignosulfonate material useful in practice of the present invention. MARASPERSE CBO, as usually available, generally has the following typical analysis and physical characteristic features:

| TYPICAL ANALYSIS (Moisture Free Basis) | |
|---|---|
| pH-3% Solution | 8.5–9.5 |
| Total Sulfur | 1.0–1.5 |
| Sulfate Sulfur as S % | 0.1–0.25 |
| Sulfite Sulfur as S % | 0.05 |
| Sulfonic Sulfur as S % | 0.85–1.2 |
| CaO % | 0.02–0.05 |
| MgO9, | Trace–0.03 |
| Na % | 6.3–7.5 |
| Reducing Sugars | 0 |
| $OCH_3$ | 12.4–13.0 |
| Sodium Lignosulfonate | 99–99.5 |

| PHYSICAL - CHARACTERISTICS | |
|---|---|
| Usual Form | Powder |
| Moisture Content (Max.) % | 8.0 |
| Color | Dark Brown - Black |
| Bulk Density (los/cu ft.) | 43–47 |
| Solubility in Water % | 100 |
| Solubility in Oil and Most Organic Solvents | 0 |
| Surface Tension 1% Soln. (Dynes/cm) | 51.4 |

(a) Resulfonated derivatives containing about 5.2 or so wt.% of organic sulfonic sulfur (based on composition weight) necessary in the practice of the present invention are made in large scale preparations by the sulfomethylation of the foregoing oxidized, hydrolyzed, desulfonated lignosulfonates MARASPERSE CBO obtained by the process described in U.S. Patent 2,491,832 and incorporated by reference herein.

The foregoing lignosulfonate starting material, MARASPERSE CBO liquor was sulfomethylated according to the following procedure wherein the following components are employed in the concentrations recited:

|  | Basis: 100 lbs. Finished Prod. lbs. solids | Basis: Gallons U.S. Measure | approx lbs. Liquid | 6000 gel Solids Lbs/gal | Batch Pounds Solids |
|---|---|---|---|---|---|
| MARASPERSE CBO Liquor | 71.29 | 5,760 | 53,450 | 2.50 | 14,400 |
| Sodium Hydroxide | 2.97 | 105 | 1,300 | 5.7 | 600 |
| Formaldehyde, (m.w.30) | 6.68 | 105 | 3,650 | 3.33 | 1,350 |
| Sodium Bisulfite (m.wt. 104) | 22.28 | — | 4,500 | — | 4,500 |
| Total | 103.22 | 6,430 | 62,900 | 3.24 | 20,850 |
| Finished Product | 100 | 4,250 | 44,880 | 4.75 | 20,200 |

To the lignosulfonate starting material there was added NaOH to a pH of 10.5±0.2; 9 percent formaldehyde based on liquor and NaOH total solids; and slowly with agitation 30 percent of sodium bisulfite based on liquor and NaOH total solids. Agitation was continued for 30 minutes; and the reaction mixture cooked for three hours at 170° C. (338° F.)l 110 psi.

(b) To the sulfomethylated product so obtained was slowly added, with agitation, 10 percent by weight of chloroacetic acid based on sulfomethylated product solids at about 170° F. Agitation and heat were applied for a period of 20 minutes whereupon 11 percent NaOH based on sulfomethylated starting material solids was added. The reaction mixture was heated to 194° F. (90° C.) and reacted for a further period of five hours at this temperature.

(c) Glucono-∂-lactone in a concentration of 14 percent based on sulfomethylated starting materials was added to the reaction product mixture and the reaction continued for a period of 30 minutes at 175° F. to 185° F. (80° C. to 85° C.).

(d) The product of the invention was secured to which NaOH was added sufficient to achieve a pH of 9.0 to 9.5. The product is spray-dried to a solids content by weight of 48 percent to 50 percent (and is very fluid when hot) to provide a powder or is prepared as a liquid by addition of water to provide a product having a 40 percent solids content.

EXAMPLE 2

An aqueous solution (1111 grams) of the sodium salt of sulfomethylated product prepared as described in Example 1 (a) and containing 500 grams of solids was adjusted in concentration in aqueous solution to 40% solids. The mechanically agitated system was heated to 80° C. and treated with 20 grams of sodium hydroxide (50%) and 50 grams of chloroacetic acid. The reaction was allowed to go to completion over a 5 hours period at 80°–90° C. The resulting chloroacetic acid reaction product had a pH of 8.2 and was 42.4% solids.

An aliquot portion (353.8 grams) of aqueous solution of resulfonated lignosulfonate-monochloroacetic reaction product designated MARASPERSE CBO S-5 CAA as prepared in a solids content of 42.4 weight percent (150 grams) was further reacted with 7.5 weight percent glucono-delta lactone (11.25 grams) based on solids in mechanically agitated equipment. Temperature of the reaction media was held at a minimum 60° C. for at least 30 minutes.

The resultant yield of product, in aqueous solution of 365.05 grams contained 44.17 weight percent solids wherein the solids (161.25 grams) constituted, as in Example 1, the sodium salt of the chemical reaction product of delta glucono lactone and the chloroacetic acid sulfomethylated reaction product. The final product was diluted to 40 weight percent solids and designated as MARAPERSE CBO S-5 CAA lactone for evaluation tests.

EXAMPLE 3

A second aliquot portion (353.8 grams) of the aqueous solution of the reaction product designated as MARASPERSE CBSO-5 CAA lignosulfonate as prepared in Example 2 (before reaction with the ∂-lactone) in a solids concentration of 42.4 weight percent (150 grams) was further reacted with 15 weight percent based on MARASPERSE CBO S-5 CAA solids of KELIG 32. KELIG 32, an aqueous solution (39.8 g), was added as a solids content of 56.4 weight percent (22.5 grams) to the MARASPERSE CBO S-5 CAA in mechanically agitated equipment. Temperature of the reaction media was held at a minimum of 60° C. for at least 30 minutes.

The resultant yield of product in aqueous solution of 393.6 grams contained 43.83 weight percent solids wherein the solids (172.5 grams) constituted the sodium salt of the chemical reaction product of KELIG 32 and MARASPERSE CBOS-5 CAA. The final aqueous solution was diluted to 40 weight percent solids and designated as MARASPERSE CBOS-5 CAA KELIG for evaluation tests.

EXAMPLE 4

Samples of the foregoing Examples 1, 2 and 3 were tested for salt tolerance, a measure of the products utility as in oil well cement retarder when operated in strong saline solutions such as North Sea Water. The test solution was an aqueous system simulating "North Sea Water" and containing 30 grams per liter sodium chloride, 1.16 grams per liter of calcium chloride and 5.54 grams per liter of magnesium chloride (giving a total dissolved content of 36.70 grams per liter of such salts.

About 0.50 grams of solids as aqueous 40 weight percent solution of the lignosulfonate based products of Example 2 and 3 as well as the unsulfomethylated MARASPERSE CBO, the sulfomethylated MARASPERSE CBOS-5 and the sulfomethylated-chloroacetic acid reacted intermediate, MARASPERSE CBOS-5 CAA were put into 50 milliliters (ml) of the North Sea Water in 60 ml jars which were shaken for 1 hour mechanically. Aliquot portions of 10 ml for each sample were centrifuged on a De Laval Centrifuge at 20,000 revolutions per minute for 2 minutes. The volume percent sludge was recoreded and presented in the following table.

| Sample | Volume Percent Sludge "North Sea Water" (37 g/l) |
|---|---|
| MARASPERSE CBO (OPcolig A) | 2.0 |
| MARASPERSE CBOS-5CAA | 0.02 |
| MARASPERSE CBOS-5CAA Lactone (of Examples 1 and 2) | 0.02 |
| MARASPERSE CBOS-5AA KELIG | 0.019 |

In all cases the products after resulfonation or sulfomethylation all showed excellent salt tolerance over the parent compound and starting material MARASPERSE CBO (Opcolig A).

It will be evident that the terms and expressions which have been employed are used as terms of description and not of limitation. There is not intention in the use of such terms and expressions of excluding equivalents of the features shown and described or portions thereof, and it is recognized that various modifications are possible within the scope of the invention claimed.

What is claimed is:

1. A composition comprising:
    a lignosulfonate or an alkali metal salt derivative thereof derived from sulfite waste liquor that has been subjected to alkaline oxidation, hydrolysis and partial desulfonation with subsequent resulfonation;
    with subsequent reaction of said resulfonated lignosulfonate, at a temperature of from about 20° C. to about 110° C., with:
    (a) a halocarboxylic acid;
    (b) a halocarboxylic acid and a hydroxy-substituted lactone;
    (c) a hydroxy-substituted lactone as aforesaid;
    (d) a halocarboxylic acid and sequentially the derivative of a sugar acid containing spent sulfite liquor derived from the reaction of a spent sulfite liquor with a cyanide followed by hydrolysis of the resulting reaction product; or
    (e) said derivative of a sugar acid-containing spent sulfite liquor.

2. A composition as claimed in claim 1, wherein said lignosulfonate prior to resulfonation has a relative molecular size within the range of about 1,000 to 20,000 and contains sulfonic sulfur after partial desulfonation of from about 0.5 weight percent to about 5.0 weight percent and from about 1.5 percent to b 15 percent by weight of said total combined sulfur upon completion of said resulfonation.

3. A composition comprising:
    an alkaline oxidized hydrolyzed, partially desulfonated and subsequently resulfonated lignosulfonate;
    said resulfonated lignosulfonate having substituted therein, as the resulfonation units, those of the formula:
    —$(C_xH_{2x})$ $SO_3H$, wherein x has a numerical integral value of from 0 to 3; or alkali metal salt derivatives thereof; and
    said resulfonated lignosulfonate containing between about 1½ percent to about 15 weight percent of total sulfur in combined organic sulfonic sulfonate form;
    said lignosulfonate prior to resulfonation having a relative molecular size of from about 1,000 to 20,000; with subsequent reaction thereof, at a temperature of from about 20° C. to about 110° C., with:
    (a) a halocarboxylic acid;
    (b) a halocarboxylic acid and a hydroxy-substituted lactone;
    (c) a hydroxy-substituted lactone as aforesaid;
    (d) a halocarboxylic acid and sequentially the derivative of a sugar acid containing spent sulfite liquor derived from the reaction of a spent sulfite liquor with a cyanide followed by hydrolysis of the resulting reaction product; or
    (e) said derivative of a sugar acid-containing spent sulfite liquor.

4. A composition as claimed in claim 1, wherein said resulfonated lignosulfonate is reacted with a halocarboxylic acid.

5. A composition as claimed in claim 1, wherein said resulfonated lignosulfonate is reacted with a halocarboxylic acid and a hydroxy-substituted lactone at a temperature of from about 75° C. to about 100° C.

6. A composition as claimed in claim 1, wherein said resulfonated lignosulfonate is reacted with a hydroxy-substituted lactone at a temperature of from about 75° C. to about 100° C.

7. A composition as claimed in claim 1, wherein said resulfonated lignosulfonate is reacted at a temperature of from about 50° C. to about 100° C., with a halocarboxylic acid and sequentially the derivative of a sugar acid-containing spent sulfite liquor derived from the reaction of a spent sulfite liquor with a cyanide followed by hydrolysis of the resulting reaction product.

8. A composition as claimed in claim 1, wherein said resulfonated lignosulfonate is reacted with a derivative of a sugar acid-containing spent sulfite liquor at a temperature of from about 50° C. to about 100° C.

9. A composition as claimed in claim 4, wherein said halocarboxylic acid is chloroacetic acid and wherein said temperature is from about 80° C. to about 100° C.

10. A composition as claimed in claim 5, wherein said halocarboxylic acid is chloroacetic acid and said lactone is glucono-δ-lactone.

11. A composition as claimed in claim 6, wherein said lactone is glucono-δ-lactone.

12. A composition as claimed in claim 7, wherein said halocarboxylic acid is chloroacetic acid; said cyanide is sodium cyanide and said spent sulfite liquor is a concentrate of hardwood pulp spent sulfite liquor.

13. A composition as claimed in claim 1, wherein said cyanide is sodium cyanide and said spent sulfite liquor is a concentrate of hardwood pulp spent sulfite liquor.

* * * * *